Patented Apr. 1, 1941

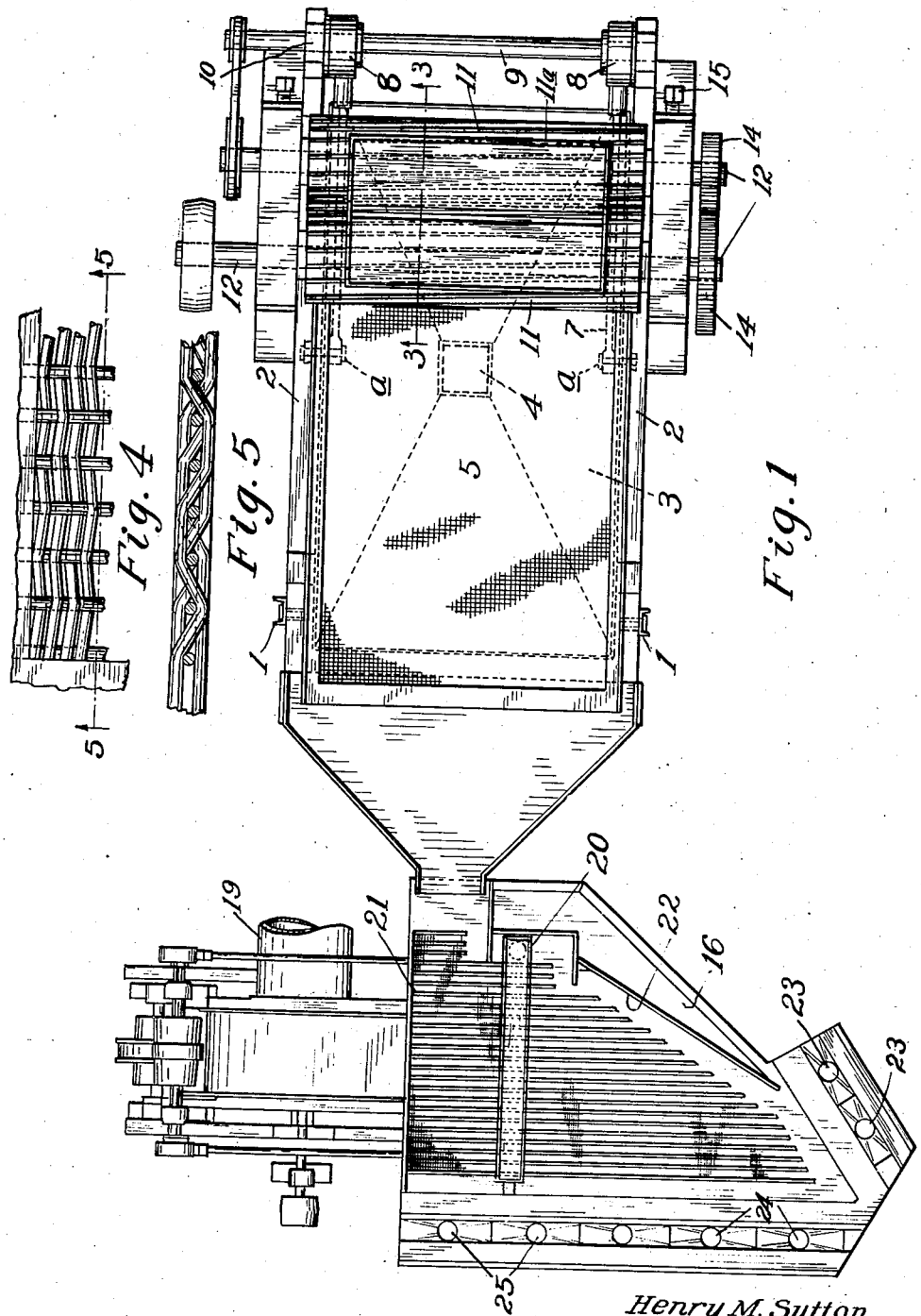

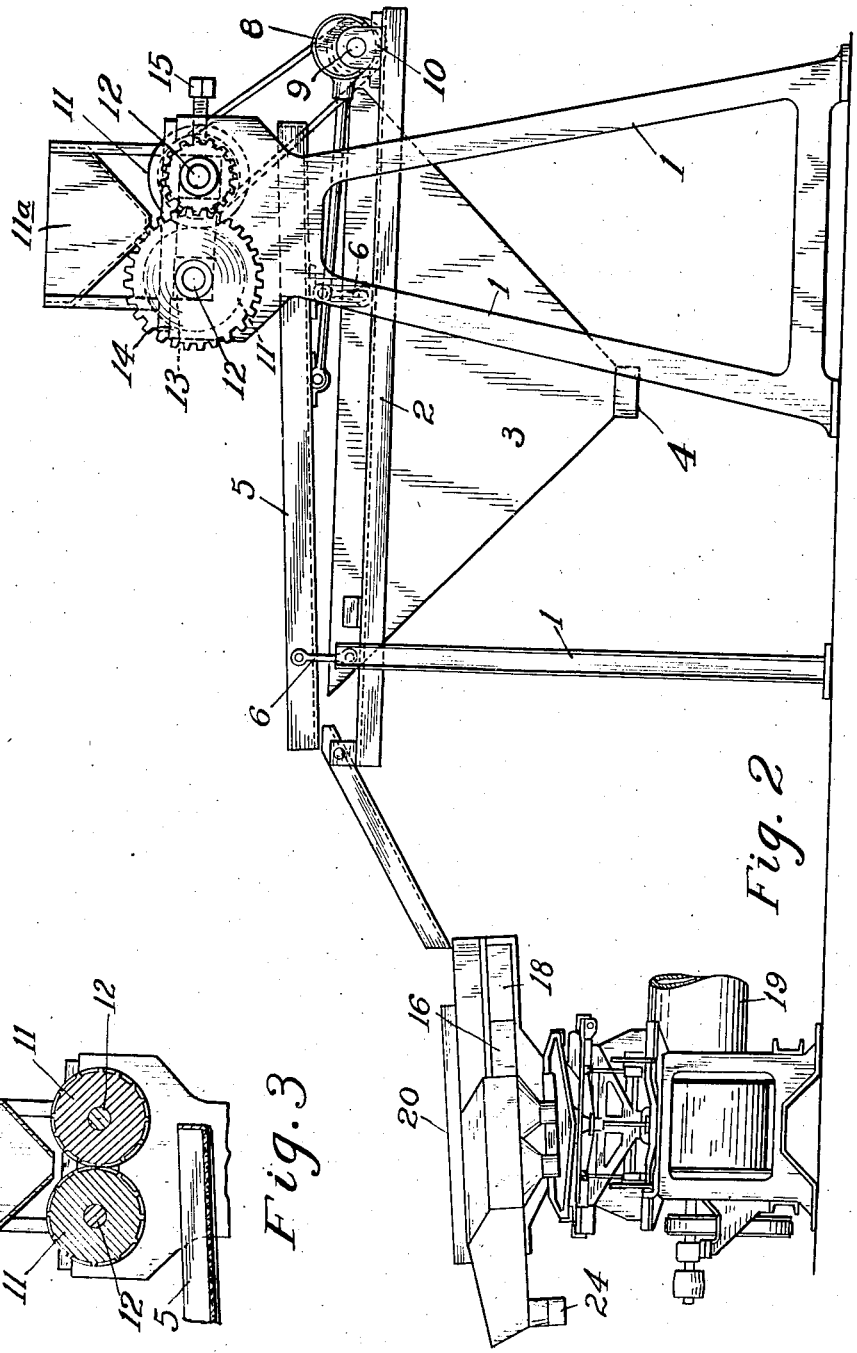

2,236,806

UNITED STATES PATENT OFFICE 2,236,806

METHOD OF EXTRACTING PURE GERM PRODUCT FROM FARINACEOUS STOCK

Henry M. Sutton and Frank E. Wood, Dallas, Tex., assignors to Reconstruction Finance Corporation, Dallas, Tex., a corporation of the United States Application March 10, 1939, Serial No. 260,944

1 Claim. (Cl. 83—42)

This invention relates to apparatus for and method of extracting germ from mill stock and it refers particularly to the art of separating by the difference in specific gravity a mill stock containing a concentrate of germ to obtain the maximum amount of pure germ and a minimum amount of endosperm or middlings and branny particles.

The principal object of the invention includes a preparatory step of reducing the size of the starchy particles of mill stock without injury to the germ and with the least disturbance possible of the bran content, and the step of sifting the fine particles of bran and endosperm or starchy particles and the step of subjecting the remaining stock to the action of an air flotation method of separating the pure germ from the endosperm, middlings and other matter reporting therewith.

Another object of the invention is to provide an apparatus, utilizing the above principles of preparation and separation of mill stock whose sifting and separating surfaces are covered with special wire or cloth mesh, the peculiar weave and porosity thereof being especially suited to the requirements of the method for complete separation.

The invention further embodies means in the form of cooperating rolls which reduce the starchy substance of the mass to a size best suited for the subsequent operation of sifting and separating, yet without injuring the germ product.

The stock for which the invention has been designed to handle most effectively is that of any mill stock or stream which is highly concentrated in germ which is as nearly as possible in its whole and natural state and consisting of branny particles ranging in size from minute pieces of bran to such particles that will remain on approximately a 20 mesh wire, together with such pieces of starchy particles whose character and composition varies with the type of stock and its preparation before being subjected to the action of corrugated rolls, operative to reduce the size of the starchy particles of the stock. These corrugated rolls constitute a part of the present invention, receiving the stock for the initial step in the preparatory treatment of the material for separation.

The germ product is hardly affected by the action of the rolls, since the latter are mounted for relative adjustment to predetermine the size to which the starchy substance is to be reduced. This operation is carried out with the least possible disturbance of the branny product. It is important that the germ be kept in its more or less natural state as it would come out of the wheat berry if uninjured.

After reduction by roll process, the stock is passed to a sifter which in turn sifts the fine particles of bran and endosperm or starchy particles. The mesh of clothing used on the sifter should conform to the type of stock or product to be handled. Due to the specific gravity of the product being identical to the germ, it is desirable that the stock be analyzed so that the ingredients tending to contaminate the pure product might be screened out before it has been subjected to the action of a specific gravity separator. However, since the products are of different size and physical character, it is possible by the sifting process to accomplish this feat and it has been shown that a large percentage of these starchy particles fall into this classification.

With the foregoing objects as paramount, the invention has reference to its salient features of construction and novel method steps illustrated in the accompanying drawings and described in the description as follows:

Figure 1 is a plan view of the complete assembly showing the preparatory rolls, sifter and pneumatic separating table.

Figure 2 is a side elevation.

Figure 3 is a detail view of the preparatory rolls in transverse section on lines 3—3 of Figure 1.

Figure 4 is a fragmentary magnified plan view of the clothing for the deck of the pneumatic table.

Figure 5 is a fragmentary view of the clothing or mesh taken on lines 5—5 on Figure 4.

Continuing with a more detailed description of the drawings, reference is primarily made to Figures 1 and 2 in which is illustrated the supporting legs 1 of the preparatory equipment. A frame 2 is supported by the legs, which in turn supports hopper 3 having a discharge opening 4 at its convergent bottom. Any manner of conduit or other receptacle may be connected to the outlet of the hopper for receiving and conveying the substance sifted through a sifter 5 reciprocably mounted immediately above and in inclined relationship with the mouth of the hopper 3. The means for supporting the sifter 5 may be in the form of links 6, connected at their upper ends to the sifter and at their lower ends to the frame 2. A pair of pitman arms 7 are pivotally connected at a to the sifter and their opposite ends are journaled in eccentric bearings 8 supported on a shaft 9 which in turn has its ends journaled in bearings 10, mounted on the frame 2.

Situated above the elevated end of the sifter 5 are corrugated rolls 11 mounted on shafts 12, the ends of which are journaled in sliding block bearings 13 (Fig. 2) in order to provide for relative adjustment of the corrugated rolls 11. The stock is deposited into the hopper 11a above the rolls 11.

It is to be noted that the gears 14 are of different diameters in order that a differential speed ratio between the rolls 11 may be obtained.

As stated, these rolls are corrugated, the corrugations being spirally arranged with respect to the axes of the rolls so that the stock in the state received by the rolls will be further but moderately disintegrated to reduce the size of the starchy particles of the mass, yet without damaging the pure germ content thereof.

To adjust the relative positions of the rolls 11, a screw 15 (Fig. 2) bears against one of the bearing blocks 13 and by manipulating this screw the position of one of the blocks is changed thereby varying the distance between the rolls.

The surface of the sifter 5 is comprised of wire mesh, the size of the interstices being predetermined in accordance with the type of stock or product to be handled. The sifting step of the process serves to analyze the stock prior to its passage over the specific gravity separator, that is to say those ingredients tending to contaminate the pure product after separation by the specific gravity separator are thereby eliminated. Although the specific gravity of products are identical to the germs, the products themselves are of different size and physical character, hence, the sifting out of the contaminating particles may be effected.

The stock having been conditioned in the manner explained, is introduced onto a specific gravity separator for further processing.

The separator best suited for separation of the germ from the branny particles and the fine starchy particle remaining in the stock is preferably of the type shown and described in Letters Patent No. 1,632,520, over which the present invention shows important improvements.

In order that the present invention may be more fully understood, the running gear of the aforementioned patent is substantially the same as shown in Figures 1 and 2 and it is not considered necessary herein to enter into a detailed description of the running gear and chassis of the separator shown other than to point out that the arrangement is such that it imparts to the deck 16 a reciprocatory combined with an oscillatory motion and this, combined with the pressure of air, supplied to the air chest 18 through conduit 19, serves to propel the heavier elements of the mass forward from under the lighter ones, due to the fact that the upward and forward motion of the deck surface has more contact with the heavier elements than with the lighter ones. The static pressure always present beneath the deck surface 16 causes the air to gently filter through the pervious deck surface which is of wire cloth of special weave as earlier expressed and whose area is substantially less than one-fourth open to passage of air, as shown in Figures 4 and 5. The result is that the entire mass on the deck surface is stratified, the heaviest elements sinking to the floor of the table, such for example as starchy particles escaping the action of the sifter, then the next and lighter elements which constitute the recoverable germ product, then next above will be the branny product and finally the upper strata will consist of nothing more than fine bran and dust particles, lighter in weight than all of the remainder of the stock.

The lighter particles such as the branny product and possibly some with fine particles of starchy product clinging thereto will be entirely confined to the space between the pneumatic skimmers 20 (Fig. 1), whose purpose will be later described, and the rear walls 21 of the table 16.

The invention does not consider as new the structure and function of the skimmers 20 and it is to be understood that their use is optional. Skimmers such as illustrated and described in patent No. 1,632,520, serve the purpose for which they may be applied in the present invention, namely, to deliver a draft of air rearward or toward the feed side of the table and opposed to their forward movement. The heavier elements of the mass pass underneath the skimmers and report upon the table separating surface in zones of separated material. For example, the heaviest material such as starchy particles, dirt and other foreign matter of substantially the same weight and physical character, hug the banking wall 22 and are discharged into hoppers 23. The intermediate strata or lighter particles which will be the pure germ will report at the delivery side of the table to be received in hoppers 24, free of any contaminating substances. The still lighter material such as the branny product and perhaps a small amount of fine starchy product will be received in the hoppers 25 for further processing in a manner with which the present invention is not concerned.

It is pointed out that the present invention is an intermediate or preparatory process, that is to say, a process interposed between the actual milling process of wheat or other similar product in one or more of its stages and the process or processes of treating or handling the separated products and more particularly the pure germ of the stock.

It is not herein considered as new to separate particles of different specific gravity by the air flotation principles of separation but the steps of the present process relating to the preparation of a mill stock for such separation is considered new in the art and which include the steps of reducing the size of the endosperm or starchy product of the mass, sifting the stock thus treated, in depositing the stock on a mechanically actuated deck to separate the same in accordance with the difference in specific gravity of the elements of the mass by supporting the same on a cushion of air, and in collecting the separated products as they report at different points along the delivery side of the deck.

Manifestly, the construction shown and the steps of the process herein defined are subject to certain changes and modifications and such changes and modifications as are considered within the scope and meaning of the appended claim are also considered within the spirit and intent of the appended claim.

What is claimed is:

The herein described process for extracting pure germ product from farinaceous stock, characterized by initially subjecting the grain to a crushing action sufficient to disintegrate outer layers of particles and insufficient to disintegrate said germ, in subjecting the ground particles to agitation and screening to effect separation of the germ particles from clinging particles of the outer layers, in distributing the screened overs on a closely woven metallic plane whose surface is substantially less than one-fourth open to the passage of air and inclined whereby particles resting loosely thereon will be drawn in one direction by gravity, in agitating the overs, in stratifying the same and subjecting the said overs to intersecting currents of air to effect separation of the particles of the overs to cause the particles to report in separate zones according to differences in specific gravity for separate collection.

HENRY M. SUTTON.
FRANK E. WOOD.